US006703115B2

(12) United States Patent
Hale et al.

(10) Patent No.: US 6,703,115 B2
(45) Date of Patent: Mar. 9, 2004

(54) MULTILAYER FILMS

(75) Inventors: Wesley Raymond Hale, Kingsport, TN (US); Ted Calvin Germroth, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/056,778

(22) Filed: Jan. 25, 2002

(65) Prior Publication Data

US 2003/0039851 A1 Feb. 27, 2003

Related U.S. Application Data

(60) Provisional application No. 60/287,876, filed on May 1, 2001.

(51) Int. Cl.[7] .......................... B32B 7/02; B32B 27/08; B32B 27/20; B32B 27/32; B32B 27/36
(52) U.S. Cl. ................. 428/212; 428/304.4; 428/317.9; 428/318.4; 428/319.3; 428/319.9; 428/423.1; 428/423.7; 428/475.2; 428/480; 428/481; 428/483; 428/910; 528/300; 528/302; 528/307; 528/308; 528/308.6; 528/308.7
(58) Field of Search .............................. 428/212, 304.4, 428/317.9, 318.4, 319.3, 319.7, 319.9, 423.7, 475.2, 480, 483, 910, 481; 528/272, 300, 302, 307, 308, 308.6, 308.7

(56) References Cited

U.S. PATENT DOCUMENTS

| 2,012,267 | A | | 8/1935 | Carothers |
| 4,427,614 | A | | 1/1984 | Barham et al. |
| 4,626,252 | A | | 12/1986 | Nishizawa et al. |
| 4,758,239 | A | | 7/1988 | Yeo et al. |
| 4,828,556 | A | | 5/1989 | Braun et al. |
| 4,863,788 | A | | 9/1989 | Bellairs et al. |
| 4,880,592 | A | | 11/1989 | Martini et al. |
| 5,073,316 | A | | 12/1991 | Bizen et al. |
| 5,143,773 | A | | 9/1992 | Takuno |
| 5,164,258 | A | | 11/1992 | Shida et al. |
| 5,446,079 | A | | 8/1995 | Buchanan et al. |
| 5,580,911 | A | | 12/1996 | Buchanan et al. |
| 5,599,858 | A | | 2/1997 | Buchanan et al. |
| 5,661,193 | A | | 8/1997 | Khemani |
| 5,817,721 | A | | 10/1998 | Warzelhan et al. |
| 5,914,184 | A | * | 6/1999 | Morman ................... 428/315.9 |
| 5,993,589 | A | * | 11/1999 | Morman ..................... 156/229 |
| 5,998,505 | A | | 12/1999 | Brink |
| 6,020,393 | A | | 2/2000 | Khemani |
| 6,045,900 | A | * | 4/2000 | Haffner et al. ........... 428/315.9 |
| 6,114,024 | A | | 9/2000 | Forte |
| 6,261,674 | B1 | * | 7/2001 | Branham et al. ............ 428/218 |

FOREIGN PATENT DOCUMENTS

| EP | 0 265 922 A2 | * | 5/1988 |
| WO | WO 98/05501 A1 | | 2/1998 |

* cited by examiner

Primary Examiner—Vivian Chen
(74) Attorney, Agent, or Firm—B. J. Boshears; Bernie Graves

(57) ABSTRACT

There are provided novel multilayer films comprising a layer comprising a thermoplastic polymer, such as an aliphatic-aromatic copolyester (AAPE), with or without filler, and a layer comprising a filled thermoplastic polymer. The polymers in the layers may be the same or different. The multilayer films are preferably characterized by having increased moisture vapor transmission rate (MVTR). Also provided are novel articles of manufacture comprising the novel multilayer films.

32 Claims, No Drawings

MULTILAYER FILMS

CROSS-REFERENCE TO RELATED APPLICATION

This application claims the benefit of Provision Application Serial No. 60/287,876 filed May 1, 2001.

FIELD OF THE INVENTION

This invention relates to multilayer films that are characterized by preferably having increased moisture vapor transmission rates (MVTR).

BACKGROUND OF THE INVENTION

Stretching of properly formulated films that are fabricated from polyolefins filled with solid particles (e.g., a mineral such as calcium carbonate), under appropriate conditions, is known to create porous structures that allow for the diffusion of water vapor while providing liquid barrier. This is a desirable property in markets such as hygienics, industrial and medical. Indeed, a major consideration in the comfort of a garment is its ability to maintain a balance between heat production and heat loss. The loss of heat through clothing may occur through direct dry heat loss or by moisture evaporation. In respect to the latter, the moisture vapor transmission rate of the material utilized in forming the garment is generally related to the breathability of the material. Breathability is the ability to diffuse moisture/water vapor through a film or garment. In addition to this property, there are many applications requiring that the material used in preparing the garment be impermeable to a liquid. Such applications include diaper back sheets, sanitary napkins, medical protective garments, surgical incise drapes, transdermal patches, wound care bandages and dressings, intravenous site dressings, ostomy site dressings, breathable construction films such as housewrap, among others. In general, porous films do not provide a sufficient barrier to bacteria and/or virus, or to wind.

Films, which are permeable to water vapor and are porous but yet are intended to be impermeable to a liquid, are described in U.S. Pat. Nos. 4,626,252 and 5,073,316. As disclosed, a porous film is obtained by mixing a polyolefin resin, an inorganic filler and a plasticizer; forming a film from the mixture; and uniaxially or biaxially stretching the film. Films of this type are also disclosed in U.S. Pat. No. 5,998,505 and PCT International Application Publication No. WO 98/05501.

Examples of multilayer breathable films are described in the following U.S. patents.

U.S. Pat. No. 6,114,024 describes a method of making a stretched, multilayer breathable film having at least 5 layers that is a barrier to bacteria. The outer layer is made of a non porous, non filler containing breathable polymer to provide bacteria barrier and to extend the process time by protecting the extruder die from build up of the filler contained in its most inner layer. This method teaches the need for microporous tie layers between the outer non-porous, non-filler containing layers and the inner filler-containing layer.

U.S. Pat. No. 5,164,258 describes a multilayer breathable film consisting of outer layers of a breathable hydrophobic material (microporous), a core hygroscopic barrier layer (monolithic), and adhesive layers disposed between the core layer and the two outer layers. This patent teaches the use of filled, unstretched polyolefins as structural support as outer layers for an inner oxygen barrier layer during steam sterilization. During steam sterilization the inner layer absorbs large amounts of water reducing its barrier to oxygen. The breathable outer layers described allow for the desorption of water from the inner layer, thus recovering the package oxygen barrier.

U.S. Pat. No. 5,143,773 discloses a multilayer film consisting of a water absorbing central layer (monolithic) with a humoctant (water absorbing material) having on one side a water impermeable, non-porous, non-breathable layer and on another side a microporous layer. This multilayer film is useful for packaging water sensitive materials where the relative humidity inside the package must be controlled.

U.S. Pat. No. 4,828,556 discloses multilayer breathable film consisting of a polyvinyl alcohol monolithic layer between two microporous non-woven web layers.

U.S. Pat. No. 4,863,788 discloses a multilayer film consisting of a microporous membrane having on one side a continuous film protective layer and on another side a cellular foam adhesive layer and a fabric substrate.

U.S. Pat. No. 4,758,239 discloses a multilayer breathable film consisting of a water-soluble polymeric layer having on one side a microporous sheet.

SUMMARY OF THE INVENTION

It is accordingly an object of the present invention to provide new and improved multi-layer films.

It is a further object of this invention to provide novel multi-layer films, which preferably are characterized by having improved moisture vapor transmission rates (MVTR).

These and other objects and advantages of the present invention will be apparent to those skilled in the art from the following detailed description and claims.

In accordance with the present invention, it has been found that the above and still further objects are achieved by providing, in a first embodiment, a multilayer film comprising:

(a) a first layer comprising from about 70 to 100 weight percent of at least one or more thermoplastic polymer (s) having a MVTR value of at least 300 g-$\mu$m/m$^2$-hour, as determined in accordance with ASTM Test Method E-96D, and from 0 to about 30 weight percent filler, and (b) a second layer comprising from about 20 to about 80 weight percent of at least one or more thermoplastic polymer(s) and from about 20 to about 80 weight percent filler and the second layer having in stretched form a MVTR value, according to ASTM E-96D, greater than the MVTR value, according to ASTM E-96D, of the at least one or more thermoplastic polymer(s) of the second layer, wherein the second layer comprises an amount of filler differing from the amount of filler in the first layer when the at least one or more thermoplastic polymer (s) of the first layer and the at least one or more thermoplastic polymer(s) of the second layer are the same, wherein the first layer is adjacent to the second layer, and wherein the multilayer film, in stretched form, has a MVTR value, according to ASTM E-96D, greater than the MVTR value, according to ASTM E-96D, of the at least one or more thermoplastic polymer(s) of the first layer.

In a second embodiment of the present invention, there is provided a multilayer film comprising:

(a) a first layer comprising
(i) from about 70 to 100 weight percent of at least one or more linear or branched or chain extended, random, aliphatic-aromatic copolyester(s) having a MVTR value of at least 300 g-$\mu$m/m$^2$-hour or g-mil/m$^2$-day, as determined in accordance with ASTM Test Method E-96D, and comprising repeating units of:

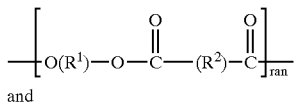

and

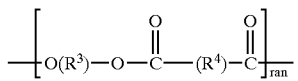

wherein $R^1$ is selected from one or more of the groups consisting of $C_2$–$C_8$ alkylene or oxylalkylene and the mole percent of $R^1$ is from about 80 to 100;

$R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{12}$ cycloalkylene (for example, 1,4-cyclohexanedimethanol); $C_5$–$C_{12}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;

$R^2$ is selected from one or more of the groups consisting of $C_2$–$C_{12}$ alkylene or oxyalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;

$R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65; and (ii) from 0 to about 30 weight percent filler, and (b) a second layer having in stretched form a MVTR value, according to ASTM E-96D, of at least about 500 g-$\mu$m/m$^2$-hour or g-mil/m$^2$-day, and comprising (i) from about 20 to about 65 weight percent of at least one or more thermoplastic polymer(s) selected from the group consisting of a polyolefin and the linear or branched or chain extended, random, aliphatic-aromatic copolyester of the first layer and (ii) from about 35 to about 80 weight percent filler; wherein the first layer is adjacent to the second layer and wherein the multilayer film, in stretched form, has a MVTR value, according to ASTM E-96D, greater than the MVTR value, according to ASTM E-96D, of the at least one or more linear or branched or chain extended, random, aliphatic-aromatic copolyester(s) of the first layer.

Additionally, the present invention is directed to articles of manufacture incorporating the novel films of the present invention. Such articles include garments, diapers, sanitary napkins, medical protective garments, surgical incise drapes, transdermal patches, wound care bandages and dressings, intravenous site dressings, and ostomy site dressings, house wrap, and others, incorporating the novel films of the present invention.

DETAILED DESCRIPTION OF THE INVENTION

In accordance with the present invention, it has been found that the above and still further objects are achieved by providing, in a first embodiment, a multilayer film comprising:

(a) a first layer comprising from about 70 to 100 weight percent of at least one or more thermoplastic polymer(s) having a MVTR value of at least 300 g-$\mu$m/m$^2$-hour, as determined in accordance with ASTM Test Method E-96D, and from 0 to about 30 weight percent filler, and (b) a second layer comprising from about 20 to about 80 weight percent of at least one or more thermoplastic polymer(s) and from about 20 to about 80 weight percent filler and the second layer having in stretched form a MVTR value, according to ASTM E-96D, greater than the MVTR value, according to ASTM E-96D, of the at least one or more thermoplastic polymer(s) of the second layer, wherein the second layer comprises an amount of filler differing from the amount of filler in the first layer when the at least one or more thermoplastic polymer(s) of the first layer and the at least one or more thermoplastic polymer(s) of the second layer are the same, wherein the first layer is adjacent to the second layer, and wherein the multilayer film, in stretched form, has a MVTR value, according to ASTM E-96D, greater than the MVTR value, according to ASTM E-96D, of the at least one or more thermoplastic polymer(s) of the first layer.

Preferably, the multilayer film in stretched form has a MVTR value greater than about 500 to about 10,000 g-$\mu$m/m$^2$-hour. The more common unit of measure for MVTR is "g-mil/m$^2$-day". The conversion of g-$\mu$m/m$^2$-hour to 9-mil/m$^2$-day is approximately one-to-one. Thus, all MVTR values herein are shown as either unit of measure.

Additionally, the present invention is directed to articles of manufacture incorporating the novel films of the present invention. Such articles include garments, diapers, sanitary napkins, medical protective garments, surgical incise drapes, transdermal patches, wound care bandages and dressings, intravenous site dressings, and ostomy site dressings, house wrap, and others, incorporating the novel films of the present invention.

In preparing the multilayer films of the present invention, there may be used in the first layer any thermoplastic polymer having a MVTR value of at least 300 to about 10,000 g-$\mu$m/m$^2$-hour or g-mil/m$^2$-day, preferably from about 300 to about 3000 g-$\mu$m/m$^2$-hour or g-mil/m$^2$-day, as determined in accordance with ASTM E-96D. Examples are thermoplastic polymers of the following groups that have a MVTR value of at least 300 to about 10,000 g-$\mu$m/m$^2$-hour or g-mil/m$^2$-day. The groups include linear or branched or chain extended aliphatic-aromatic copolyesters, polylactic acid (PLA) polymers and copolymers, polyurethanes, polyhydroxybutyrate and poly hydroxybutyrate and other polyhydroxybutyrate copolymers with co-monomers such as valeric acid and gamma hydroxy alkanoates, polyesteramides (such as BAK™ polymers produced by Bayer), poly vinyl alcohol, cellulose esters, polycaproyl lactone (PCL) polymers and copolymers, HYTREL™ copolymers of for example terephthalic acid, isophthalic acid, with various diols (e.g. butane diol) and polytetramethylene glycol or polypropylene glycol produced by DuPont, PEBAX™ polyether amides with polyethylene glycol produced by Ato-Chem, SYMPATEX™ polyethylene glycol modified polybutylene terephthalate produced by Akzo, and various polyether urethanes, or blends thereof.

The aliphatic-aromatic copolyesters of the present invention (referred to as AAPE herein) include those described in U.S. Pat. Nos. 5,661,193; 5,599,858; 5,580,911; and 5,446,079. The entire disclosures of each patent are herein incorporated by reference. More specifically, the AAPEs are essentially, linear, random copolyesters or branched and/or chain extended copolyesters thereof having repeating units of:

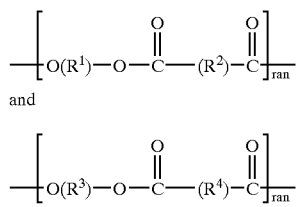

and wherein
R$^1$ is selected from one or more of the groups consisting of C$_2$–C$_8$ alkylene or oxylalkylene and the mole percent of R$^1$ is from about 80 to 100;
R$^3$ is selected from one or more of the groups consisting of C$_2$–C$_8$ alkylene or oxylalkylene; C$_2$–C$_8$ alkylene or oxylalkylene substituted with one to four substituents independently selected from the group consisting of halo, C$_6$–C$_{10}$ aryl, and C$_1$–C$_4$ alkoxy; C$_5$–C$_{12}$ cycloalkylene (for example, 1,4-cyclohexanedimethanol); C$_5$–C$_{12}$ cycloalkylene substituted with one to four substituents independently selected from the group consisting of halo, C$_6$–C$_{10}$ aryl, and C$_1$–C$_4$ alkoxy; and the mole percent of R$^3$ is from 0 to about 20;
R$^2$ is selected from one or more of the groups consisting of C$_2$–C$_{12}$ alkylene or oxyalkylene; C$_2$–C$_{12}$ alkylene or oxylalkylene substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^2$ is from about 35 to about 95;
R$^4$ is selected from one or more of the groups consisting of C$_6$–C$_{10}$ aryl; C$_6$–C$_{10}$ aryl substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^4$ is from about 5 to about 65.

Preferred AAPEs are those wherein R$^1$ is selected from C$_2$–C$_8$ alklyene and is present in an amount of from about 90 to 100 mole percent; R$^3$ is present in an amount of from 0 to about 10 mole percent; R$^2$ is selected from one or more of the groups consisting of C$_2$–C$_8$ alkylene or oxyalkylene and is present in an amount from about 35 to about 95 mole percent; and R$^4$ is selected from one or more of the groups consisting of C$_6$–C$_{10}$ aryl and is present in an amount of from about 5 to about 65 mole percent. More preferred AAPEs are those wherein R$^1$ is selected from C$_2$–C$_4$ alklyene and is present from about 95 to 100 mole percent; R$^3$ is present from 0 to about 5 mole percent; R$^2$ is selected from one or more of the groups consisting of C$_2$–C$_6$ alkylene or C$_2$ oxyalkylene and is present from about 35 to about 65 mole percent; R$^4$ is 1,4-disubstituted-C$_6$ aryl and is present from about 35 to about 65 mole percent.

As used herein the terms "alkyl" and "alkylene" refer to either straight or branched chain moieties such as —CH$_2$—CH$_2$—CH$_2$—CH$_2$— and —CH$_2$CH(X)—CH$_2$—. The term "oxyalkylene" refers to alkylene chains containing from 1 to 4 ether oxygen groups. The term "cylcoalkylene" refers to any alkyl group that contains a cycloalkyl moiety.

Other preferred compositions for these AAPE are those prepared from the following diols and diacids (or polyester forming derivatives thereof) in the following mole percent, based on 100 mole percent of a diacid component and 100 mole percent of a diol component:

(1) glutaric acid (about 30 to about 75%); terephthalic acid (about 25 to about 70%); 1,4-butanediol (about 90 to 100%); and modifying diol (0 about 10%).
(2) succinic acid (about 30 to about 95%); terephthalic acid (about 5 to about 70%); 1,4-butanediol (about 90 to 100%); and modifying diol (0 to about 10%).
(3) adipic acid (about 30 to about 75%); terephthalic acid (about 25 to about 70%); 1,4-butanediol (about 90 to 100%); and modifying diol (0 to about 10%).

The modifying diol is preferably selected from 1,4-cyclohexanedimethanol, triethylene glycol, polyethylene glycol and neopentyl glycol. The most preferred AAPEs are linear, branched or chain extended copolyesters comprising about 50 to about 60 mole percent adipic acid, about 40 to about 50 mole percent terephthalic acid, and at least 95 mole percent 1,4-butanediol. Even more preferably, the adipic acid is present from about 55 to about 60 mole percent, the terephthalic acid is present from about 40 to about 45 mole percent and at least 95 mole percent 1,4-butanediol. Such compositions are co$\mu$mercially available from Eastman Chemical Company, Kingsport, Tenn.

Specific examples of preferred AAPE include a poly(tetramethylene glutarate-co-terephthalate) containing (a) 50% glutaric acid/50% terephthalic acid/100% 1,4-butanediol, (b) 60% glutaric acid/40% terephthalic acid/100% 1,4-butanediol or (c) 40% glutaric acid/60% terephthalic acid/100% 1,4-butanediol; a poly(tetramethylene succinate-co-terephthalate) containing (a) 85% succinic acid/15% terephthalic acid/100% 1,4-butanediol or (b) 70% succinic acid/30% terephthalic acid/100% 1,4-butanediol; a poly(ethylene succinate-co-terephthalate) containing 70% succinic acid/30% terephthalic acid/100% ethylene glycol; and a poly(tetramethylene adipate-co-terephthalate) containing 85% adipic acid/15% terephthalic acid/100% 1,4-butanediol.

Desirably, the AAPE has from about 10 to about 1,000 repeating units and preferably, from about 15 to about 600 repeating units. Preferably, the AAPE has an inherent viscosity of about 0.4 to about 2.0 dL/g, more preferably about 0.7 to about 1.4, as measured at a temperature of 25° C. for a 0.5 gram sample in 100 ml of a 60/40 by weight solution of phenol/tetrachloroethane.

The AAPE of the present invention may also contain a branching agent. The weight percent ranges for the branching agent are from about 0.01 to about 10 percent, preferably 0.1 to 1.0 weight percent, based on the total weight percent of the AAPE.

The branching agent preferably has a weight average molecular weight of about 50 to about 5000, more preferably about 92 to about 3000, and a functionality of about 3 to about 6. The branching agent may be a polyol having 3 to 6 hydroxyl groups, a polycarboxylic acid having 3 or 4 carboxyl groups or a hydroxy acid having a total of 3 to 6 hydroxyl and carboxyl groups.

Representative low molecular weight polyols that function as branching agents include glycerol, trimethylolpropane, 1,2,4-butanetriol, pentaerythritol, 1,2,6-hexanetriol, sorbitol, 1,1,4,4,-tetrakis (hydroxymethyl) cyclohexane, tris(2-hydroxyethyl) isocyanurate, and dipentaerythritol. Particular branching agent examples of higher molecular weight polyols (MW 400–3000) are triols derived by condensing alkylene oxides having 2 to 3 carbons, such as ethylene oxide and porpylene oxide with polyol initiators.

Representative polycarboxylic acids that may be used as branching agents include hemimellitic acid, trimellitic acid, trimesic acid, pyromellitic acid, benzene tetracarboxylic acid, benzophenone tetracarboxylic acid, 1,1,2,2-ethanetetracarboxylic acid, 1,1,2-ethanetricarboxylic acid, 1,3,5-pentanetricarboxylic acid, and 1,2,3,4-cyclopentanetetra-carboxylic acid. Although the acids may be used as such, preferably they are used in the form of their lower alkyl esters or their cyclic anhydrides in those instances where cyclic anhydrides can be formed.

Representative hydroxy acids as branching agents include malic acid, citric acid, tartaric acid, 3-hydroxyglutaric acid, mucic acid, trihydroxyglutaric acid, and 4-(beta-hydroxyethyl)phthalic acid. Such hydroxy acids contain a combination of 3 or more hydroxyl and carboxyl groups.

Especially preferred branching agents include trimellitic acid, trimesic acid, pentaerythritol, trimethylol propane and 1,2,4-butanetriol.

One example of the branched AAPE of the present invention is poly(tetramethylene adipate-co-terephthalate) containing 100 mole percent 1,4-butanediol, 43 mole percent terephthalic acid and 57 mole percent adipic acid and being branched with 0.5 weight percent pentaerythritol. This copolyester is produced when dimethyladipate, dimethyl terephthalate, pentaerythritol and 1,4-butanediol are heated at 190° C. for 1 hour, 200° C. for 2 hours, 210° C. for 1 hour, then at 250° C. for 1.5 hours under vacuum in the presence of 100 ppm of Ti present initially as Ti(O$^i$Pr)$_4$. The copolyester is typically pelletized after formation for use in extrusion foaming.

Another branched AAPE of the present invention is poly(tetramethylene adipate-co-terephthalate) containing 100 mole percent 1,4-butanediol, 43 mole percent terephthalic acid and 57 mole percent adipic acid and being branched with 0.3 weight percent pyromellitic dianhydride. This copolyester is produced via reactive extrusion of linear poly (tetramethylene adipate-co-terephthalate) with pyromellitic dianhydride using an extruder.

The AAPE of the present invention may also contain a chain extender. Exemplary chain extenders are divinyl ethers as disclosed in U.S. Pat. No. 5,817,721 and herein incorporated by reference. Preferred divinyl ethers are 1,4-butanediol divinyl ether, 1,5-hexanediol divinyl ether and 1,4-cyclohexandimethanol divinyl ether. The weight percent ranges for the chain extender are from 0.01 to 5 percent, preferably 0.3 to 2.5 weight percent, based on the total weight percent of the AAPE.

The preparation of polyesters and copolyesters is well known in the art (U.S. Pat. No 2,012,267, incorporated herein by reference in its entirety.) Such reactions are usually carried out at temperatures from 150° C. to 300° C. in the presence of polycondensation catalysts such as titanium tetrachloride, manganese diacetate, antimony oxide, dibutyl tin diacetate, zinc chloride, or combinations thereof. The catalysts are typically employed in amounts between 10 to 1000 ppm, based on total weight of the reactants. For the purpose of the present invention, a representative aliphatic polyester is the polycondensation product of dimethylglutarate and 1,6-hexanediol. This polyester, poly (hexamethylene glutarate), is produced when dimethylglutarate and 1,6-hexanediol are heated at approximately 210° C. for 4 hours and then at 260° C. for 1.5 hours under vacuum in the presence of 100 ppm of Ti. A representative aliphatic-aromatic copolyester is poly(tetramethylene glutarate-coterephthalate) containing 30 mole per cent terephthalate. This polyester is produced when dimethylglutarate, dimethyl terephthalate, and 1,4-butanediol are heated at 200° C. for 1 hour then at 245° C. for 0.9 hour under vacuum in the presence of 100 ppm of Ti present initially as Ti(O$^i$Pr)$_4$.

In a second embodiment of the present invention, there is provided a multilayer film comprising:
(a) a first layer comprising
  (i) from about 70 to 100 weight percent of at least one or more linear or branched or chain extended, random, aliphatic-aromatic copolyester(s) having a MVTR value of at least 300 g-$\mu$m/m$^2$-hour or g-mil/m$^2$-day, as determined in accordance with ASTM Test Method E-96D, and comprising repeating units of:

and

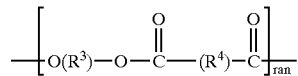

wherein
R$^1$ is selected from one or more of the groups consisting of C$_2$–C$_8$ alkylene or oxylalkylene and the mole percent of R$^1$ is from about 80 to 100;
R$^3$ is selected from one or more of the groups consisting of C$_2$–C$_8$ alkylene or oxylalkylene; C$_2$–C$_8$ alkylene or oxylalkylene substituted with one to four substituents independently selected from the group consisting of halo, C$_6$–C$_{10}$ aryl, and C$_1$–C$_4$ alkoxy; C$_5$–C$_{12}$ cycloalkylene (for example, 1,4-cyclohexanedimethanol); C$_5$–C$_{12}$ cycloalkylene substituted with one to four substituents independently selected from the group consisting of halo, C$_6$–C$_{10}$ aryl, and C$_1$–C$_4$ alkoxy; and the mole percent of R$^3$ is from 0 to about 20;
R$^2$ is selected from one or more of the groups consisting of C$_2$–C$_{12}$ alkylene or oxyalkylene; C$_2$–C$_{12}$ alkylene or oxylalkylene substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^2$ is from about 35 to about 95;
R$^4$ is selected from one or more of the groups consisting of C$_6$–C$_{10}$ aryl; C$_6$–C$_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65; and (ii) from 0 to about 30 weight percent filler, and (b) a second layer having in stretched form a MVTR value, according to ASTM E-96D, of at least about 500 g-$\mu$m/m$^2$-hour or g-mil/m$^2$-day, and comprising (i) from about 20 to about 65 weight percent of at least one or more thermoplastic polymer(s) selected from the group consisting of a polyolefin and a linear or branched or chain extended, random, aliphatic-aromatic copolyester of the first layer and (ii) from about 35 to about 80 weight percent filler; wherein the first layer is adjacent to the second layer and wherein the multilayer film, in stretched form, has a MVTR value, according to ASTM E-96D, greater than the MVTR value, according to ASTM E-96D, of the at least one or more linear or branched or chain extended, random, aliphatic-aromatic copolyester(s) of the first layer.

Preferably, the multilayer film in stretched form has a MVTR value greater than about 500 to about 10,000 g-$\mu$m/m$^2$-hour or g-mil/m$^2$-day. Also, the second layer preferably has in stretched form a MVTR value, according to ASTM E-96D, of at least about 500 to about 10,000 g-$\mu$m/m$^2$-hour or g-mil/m$^2$-day.

In preparing the multilayer films of the invention where a polyolefin is utilized in the second layer, there may be used any polyolefin that when filled with the appropriate type and amount of filler as described herein and, when stretched, has a MVTR value, according to ASTM E-96D, of at least about 500 to about 10,000 g-$\mu$m/m$^2$-hour or g-mil/m$^2$-day.

The polyolefins that may be used in the present invention are described as follows. The polyolefins can be homopolymers of ethylene, propylene, copolymers thereof, or combinations thereof. Suitable polyolefins include high density polyethylene, medium density polyethylene, linear low density polyethylene, or mixtures thereof. Polyolefin copolymers are prepared with propylene or ethylene and at least one or more other olefin(s). Preferably, the olefins are alpha-olefins. Typical density ranges for these linear low density polyethylenes are in the range of 0.90 to 0.94 g/cc. Typical melt index ranges from 0.1 to 10 g/10 min (measured in accordance with ASTM D 1238-70). The olefins may contain from about 2 to about 16 carbon atoms. The copolymer of ethylene or propylene and at least one other olefin comprise an ethylene or propylene content of at least about 50 percent by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene.

The ethylene homopolymer or interpolymer of the present composition may be prepared by any manner known to those skilled in the art.

The filler useful in preparing the compositions of this invention in the first or second embodiments includes any filler material that will result in a composition from which a stretched film that is produced is characterized by having an increased MVTR as compared to a film prepared from the composition in the absence of filler. The amount of filler utilized is any amount that is effective or sufficient to provide a composition from which there can be produced films having the increased MVTR. The filler will be present in the polymer-filler composition in an amount of from 0 to about 80 percent by weight, preferably from about 20 to about 80 percent by weight, based on the total composition. However, where a polyolefin is used in producing the composition, the filler will be present in an amount of from about 35 to about 80 percent by weight, based on the total composition.

Exemplary fillers that are suitable for use herein are inorganic fillers such as calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium oxide, titanium oxide, aluminum oxide, mica, glass powder, zeolite, silica clay, wood flour, cellulose, and the like. Preferred for use herein is a calcium carbonate, that may optionally be coated with a fatty acid. A typical calcium carbonate is that supplied by English China Clay under the registered trademark SUPERCOAT calcium carbonate, reported as being 97.6 weight percent calcium carbonate (prior to surface treatment) with a mean particle size of 1 micron (top cut of 10 microns) and surface area of 7.2 m$^3$/g (determined by BET).

For many purposes, it may be desirable to incorporate other conventional additives with the polymeric compositions of the present invention. For example, there may be added antioxidants, heat and light stabilizers, dyes, antistatic agents, lubricants, preservatives, processing aids, slip agents, antiblocking agents, pigments, flame retardants, blowing agents, and the like. More than one additive may be used. The additive may be present in any desired amount. Accordingly, the amount of additive utilized will depend upon the particular polymer and filler used and the application or usage intended for the composition and film. Compositions containing such other additives are within the scope of this invention. It is within the skill of the ordinary artisan in possession of the present disclosure to select the appropriate additive(s) and amount thereof depending on the processing conditions and end use of the composition.

The polymer-filler compositions, and monolayer or multilayer films, can be prepared utilizing any means known in the art. For example, filler containing compositions can be prepared in an apparatus such as a torque rheometer, a single screw extruder or a twin-screw extruder. Formation of films can be achieved by melt extrusion, as described, for example, in U.S. Pat. No. 4,880,592, or by compression molding as described, for example, in U.S. Pat. No. 4,427, 614, or by any other suitable method.

The compositions may be fabricated into mono-layer or multi-layer films by any technique known in the art. For example, mono-layer, or multi-layer films may be produced by the well known cast film, blown film and extrusion coating techniques, the latter including extrusion onto a substrate. Preferred substrates include woven and nonwoven fabrics. Mono-layer, or multi-layer films produced by melt casting or blowing can be thermally bonded or sealed to a substrate using an adhesive. The ordinary artisan, in possession of the present disclosure, can prepare such multilayer films and articles containing such films without undue experimentation.

The multilayer films of the present invention may be prepared by any method known in the art. For example, the multilayer structures of this invention are readily prepared by conventional coextrusion processes, a conventional in-line or off-line lamination process or a conventional extrusion coating process, all well known in the art. In general, in a coextrusion process, the polymers are brought to the molten state and coextruded from a conventional extruder through a flat sheet die, the melt streams being combined in a coextrusion feed block or multimanifold die prior to exiting the die. After leaving the die, the multi-layer film structure is quenched and removed for subsequent handling.

The monolayer or multilayer films described herein can be stretched by any known method. Stretching of a film is defined herein as the elongation of a material beyond the yield point of the material to render permanent the deformation of the material. In so doing, the films must be stretched at a temperature at least below the Vicat softening point +20° C., this temperature being determined by the exact stretching process used and the rate at which film is being stretched (Vicat is determined by ASTM D1525). Typically stretching occurs at or below the Vicat softening point.

As shown hereinafter in the examples, cast multi-layer film was produced from the filler containing compositions and unfilled polyester. ABA or AB type structures were prepared where (A) layers were filler containing polyester and/or polyolefin compositions, and the (B) layer was unfilled and filled polyester. The multilayer films were prepared by the following coextrusion process. Main extruder used was a conventional 5.08 cm diameter extruder, 30:1 L:D (length:diameter) ratio, fitted with an internally cooled barrier screw with 3:1 compression ratio and twisted maddock mixing section. Satellite extruders employed were 2.54 cm and 3.175 cm, 24:1 L:D, fitted with general purpose screws with 3:1 compression ratios. A Precision Component feedblock (designed for 10/80/10 distribution) was used to convey the melt to a conventional 76.2 cm coathanger die. A 2-roll cast film downstack configuration was used for quenching the melt. Additionally mono-layer film was produced from the filler containing polyester by introducing the filler-containing polyester composition into the feed hoppers of a 3.81 cm, 24:1 Killian single screw extruder equipped with a 30.48 cm wide film die and a chilled casting roll. The extrusion conditions used to produce the films were as follows:

| Barrel Temperatures | | |
| --- | --- | --- |
| Zone 1 | ° C. | 150 |
| Zone 2 | ° C. | 150 |
| Zone 3 | ° C. | 150 |
| Clamp | ° C. | 150 |
| Adaptor | ° C. | 150 |
| Die Temperatures | | |
| Zone 1 | ° C. | 150 |
| Zone 2 | ° C. | 150 |
| Zone 3 | ° C. | 150 |

The monolayer or multilayer films described herein can be stretched by any known method. Stretching of a film is defined herein as the elongation of a material beyond the yield point of the material to render permanent the deformation of the material. In so doing, the films must be stretched at a temperature at least below the Vicat softening point +20° C., this temperature being determined by the exact stretching process used and the rate at which film is being stretched (Vicat is determined by ASTM D1525). Typically stretching occurs at or below the Vicat softening point.

Such known methods of stretching are roll-to-roll, tenter frame, ring-roll or intermeshing, TM Long, and hand stretching. The multi-layer and mono-layer films of the present invention were stretched via hand stretching at room temperature and accordingly were fabricated at a thickness of about 75 to about 125 $\mu$m. Roll-to-roll stretching is generally performed by passing a film across a series of rolls where adjacent, downstream rolls are rotating at higher rates than upstream rolls. The simplest example is a film passing over two rolls, the second rotating faster than the first resulting in the film being stretched in the region in between the two rolls. Tenter frame stretching involves gripping a film and then moving the grips apart from one another, stretching the film in between. Such processes can involve preheating of the film prior to stretching and heat setting after stretch.

Ring-roll stretching or intermesh stretching is performed by passing the film between two parallel rolls having a surface of intermeshing gear-like teeth where the degree of stretch that is applied to the film is controlled by the degree of gear engagement, i.e., how close the rolls are brought together. Machine direction stretching is accomplished using rolls where the gear-like teeth span the cross direction of the upper and lower roll analogous to a wide cog or pitch spur gears. Cross direction stretching is accomplished by covering the surface of the rolls with intermeshing disks. Passing a film through the machine direction stretching device produces uniform stretched bands spanning the cross direction of the film. Passing a film through the cross direction stretching device produces uniform stretched bands spanning the machine direction of the film. Passing film through both of these devices produces a film bearing a crosshatched or checkered pattern.

The TM Long film stretcher (named for the producer) uniaxially or biaxially stretches samples of pressed, blown, or extruded film. The operation of the film stretcher is based upon the movement of two drawbars at right angles to each other upon hydraulically driven rods. There is a fixed draw bar opposed to each moving draw bar. These pairs of opposed moving and fixed draw bars, to which the four edges of the film specimen are attached, form the two axes at right angles to each other along which the specimen is stretched in any stretch ratio up to four or seven times original size, depending on the machine being used. Samples are placed in grips on the machine and heated prior to stretching if desired. The outputs from the device are stress versus elongation data (if desired) at the temperature of the experiment and the stretched film.

Hand stretching is performed by gripping a piece of film between one's hands and then moving the hands away from each other allowing the film to stretch in between. The film is stretched to produce a piece of whitened film at least three inches long. Films can be hand stretched in one direction (uniaxial) and then gripped again in the cross direction to stretch again from 0.5 to 500 percent elongation and create biaxial orientation.

For Examples 1–8 samples were uniaxially stretched by the hand method and then biaxially stretched samples were prepared by gripping the uniaxially stretched film in the cross direction and stretching from 10 to 30 percent elongation.

Additionally, the present invention is directed to articles of manufacture incorporating the novel multi-layer films, of the present invention. Such articles include, but are not limited to, garments, diapers sanitary napkins, medical protective garments, surgical incise drapes, transdermal patches, wound care bandages and dressings, intravenous site dressings, and ostomy site dressings, house wrap, and others. The articles can be produced utilizing any suitable technique.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the properties of the polymer component, and the physical properties of the multi-layer films produced.

(a) Moisture Vapor Transmission Rate (MVTR) is measured according to ASTM Test Method E-96D. The apparatus for this experiment consists of a test dish, environmental Thermotron test chamber, and a balance. The test dish is noncorroding and is impermeable to liquid water and water vapor. The mouth area of the dish defines the test area such that the overlay material is masked to eliminate this potential source of error. The water level is filled to 1.91 cm below the mouth to avoid contact of water with the specimen and covers the dish bottom throughout the entire experiment. The Thermotron test chamber Model SM5.5S controls the temperature and relative humidity. The temperature for this work was selected at 32° C. (90° F.), which is the standard test condition designated as ASTM E-96D. The relative humidity is maintained at 50±2%. Air is continuously circulated over the face of the film at a rate of 200 m/s (meters per second). The Mettler P1200 balance detects changes in weight smaller than 1% (0.01 grams) of the weight change during the steady state period. Samples are secured on the test dish and weighed. The samples are then placed into the test chamber for two hours and then weighed again. The samples are put back into the oven for a total of 24 hours and the weights are measured twice more over the 24-hour period. The MVTR of each samples is calculated by the following equation:

$$MVTR=(g*L)/(A)(T)$$

Where
g=weight change during test (grams)
A=test area (m$^2$)
T=time=hours (day)
L=film thickness µm (mil)
The weight loss data is plotted and the slope of the straight line is the rate of the water vapor transmission through the film. The slope of the line is then divided by the area of the sample tested and multiplied by the film thickness to obtain a normalized MVTR.

Examples 1–2

In Examples 1 and 2 multi-layer structures were prepared having three layers where the outer layers were comprised of a filled polyethylene and the center layer was either unfilled AAPE (Example 1) or AAPE containing 20 weight percent (wt %) filler (Example 2).

In producing the filled polyethylene layer, the polyethylene component and the filler were compounded in a Kobelco continuous mixer model NEX-T60. The mixer was operated at 205° C. and at a mixing speed of 800 rpm. The polyethylene component and the filler were fed to the mixer to produce a polyethylene filler composition containing 50 wt % filler. Additionally, 100 ppm Dynamar FX 9613 processing aid (supplied by Dyneon, Oakdale, Minn.) and 150 ppm Irganox B215 antioxidant (supplied by Ciba Specialty Chemicals Corporation, Tarrytown, N.Y.) were added to the polyethylene filler composition during mixing. The filler utilized to prepare the polyethylene compositions was Filmlink™ 400 calcium carbonate. The polyethylene of Examples 1 and 2 was an ethylene-1-hexene interpolymer having a density of 0.915 g/cc, and a melt index of 3 g/10 min.

The AAPE component was poly(tetramethylene adipate-co-terephthalate), a copolyester of butane diol with adipic acid and terephthalic acid where the adipic to terephthalic acid ratio is 57/43. In preparing the AAPE compositions containing 20 wt % filler in the examples herein, the AAPE component and the filler were compounded in a Kobelco continuous mixer model NEX-T60. The mixer was operated at 175° C. and at a mixing speed of 600 rpm. The AAPE component and the filler were fed to the mixer to produce an AAPE filler composition containing 70 wt % filler. This AAPE filler composition was then pellet-pellet blended with unfilled AAPE to reduce the filler content to 20 wt %. The filler utilized was Filmlink™ 500 calcium carbonate. Each of the compositions of Examples 1 and 2 were coextruded into multi-layer film as shown herein. The AAPE components were dried overnight to remove moisture prior to coextrusion. Each of the films of Examples 1 and 2 were then biaxially stretched at room temperature, as shown herein, by means of the hand stretching method.

The stretched films of Examples 1 and 2 were then evaluated to determine the properties set forth in Table 1. Also shown in Table 1 is the MVTR of a stretched monolayer of the same polyethylene filler component stretched at room temperature uniaxially by the hand stretching method. The AAPE used for these examples has a reported MVTR of 534 g-µ/m$^2$/hour or g-mil/m$^2$-day as shown herein.

TABLE 1

| | Film Properties | | | |
|---|---|---|---|---|
| Example No. | 1 | 2 | Polyethylene-filler monolayer | Unstretched Unfilled AAPE |
| Average MVTR, g-µm/m$^2$/hour | 767 | 914 | 926 | 534 |
| Stretched film thickness (µm) | 25.8 | 32.3 | 16.5 | — |
| Unstretched film layer thickness | | | | |
| Top layer (µm) | 54 | 35 | 54 | 38.5 |
| Center layer (µm) | 21 | 21.3 | — | — |
| Bottom layer (µm) | 19 | 25 | — | — |

From Examples 1 and 2, it is observed that the multilayer films of the present invention are characterized by having increased MVTR values, as compared to the MVTR value of the control film, comprising unfilled AAPE. The observed MVTR values of the multilayer films of the present invention are indicative of films possessing breathability characteristics. In addition, it is expected that the multilayer films of the present invention will be a barrier to virus, bacteria, and/or wind.

Examples 3–8

In Examples 3–6, multi-layer films were prepared having three layers where the outer layers were comprised of 50 wt % filled AAPE and the center layer was either unfilled AAPE (as in Examples 3, 4, and 7) or AAPE containing 20 wt % filler (as in Examples 5 and 6). Example 7 is a two layer film comprised of a first layer of 50 wt % filled AAPE and a second layer of unfilled AAPE. Example 8 is a single layer film comprised of 50 wt % filled AAPE. The AAPE component was poly(tetramethylene adipate-co-terephthalate), a copolyester of butane diol with adipic acid and terephthalic acid where the adipic to terephthalic acid ratio is 57/43. In preparing the AAPE compositions containing 50 and 20 wt % filler of the examples herein, the AAPE component and the filler were compounded in a Kobelco continuous mixer model NEX-T60. The mixer was operated at 175° C., and a mixing speed of 600 rpm. The AAPE component and the filler were fed to the mixer to produce an AAPE filler composition containing 70 wt % filler. This AAPE filler composition was then pellet-pellet blended with unfilled AAPE to reduce the filler content to 50 or 20 wt %. The filler utilized was Filmlink™ 500 calcium carbonate. Each of the compositions of Examples 3–7 were coextruded into multi-layer film as shown herein. Example 8 was extruded into monolayer film as shown herein. The components were dried overnight to remove moisture prior to coextrusion. Each of the films of Examples 3–8 were then biaxially stretched at room temperature, as shown herein, by means of the hand stretching method. The stretched films of Examples 3–8 were then evaluated to determine the properties set forth in Table 2. The MVTR of a monolayer film of the same unfilled AAPE component is shown in Table 1.

TABLE 2

| | Film Properties | | | | | |
|---|---|---|---|---|---|---|
| Example No. | 3 | 4 | 5 | 6 | 7 | 8 |
| Average MVTR, g-μm/m²/hour | 1190 | 1074 | 966 | 1462 | 1665 | 1931 |
| Stretched film thickness (μm) | 30 | 45 | 27.8 | 39 | 39.3 | 28.5 |
| Unstretched film layer thickness | | | | | | |
| Top layer (μm) | 50 | 51.5 | 31 | 52 | 46 | — |
| Center layer (μm) | 32 | 33 | 36 | 37 | | — |
| Bottom layer (μm) | 19 | 50 | 36 | 30 | 15.8 | — |

From the data in Examples 3–7, it is observed that the multilayer films of the present invention are characterized by having MVTR values increased when compared with the MVTR value of a film formed from a mono-layer of unfilled AAPE. As in Examples 1 and 2, the multilayer films of Examples 3–7, have MVTR values that are indicative of films having good breathability characteristics. In addition, it is expected that the multilayer films of the present invention will be a barrier to virus, bacteria and/or wind.

Examples 1–7 have MVTR values comparable to the filled and stretched monolayer films shown in Tables 1 and 2. However, filled and stretched monolayer films are not expected to be a barrier to virus, bacteria and/or wind.

Examples 9–12

As shown hereinafter in Examples 9–12, the multi-layer film was produced from the filler containing AAPE polyester and either unfilled polycaprolactone (PCL) polyester (Examples 9, 10), or unfilled polyester-ether (Example 11), or unfilled polyurethane (Example 12). ABA type structures were prepared where (A) layers were filler containing AAPE polyester, and the (B) layer was either unfilled PCL polyester (Examples 9, 10), or unfilled polyester-ether (Example 11), or unfilled polyurethane (Example 12).

The multilayer films were prepared by the following coextrusion process. To feed the filler containing polyester, the main extruder used was a conventional 2.54 cm diameter Killian extruder, 24:1 L:D (length:diameter) ratio, fitted with a feed screw with 3:1 compression ratio and twisted maddock mixing section. A second identical extruder was employed to feed the unfilled materials. A Killian coextrusion feedblock was used to convey the melt to a conventional 15.24 cm coathanger die. A 2-roll cast film downstack configuration was used for quenching the melt. Additionally mono-layer film was produced from the unfilled polymers by introducing the unfilled polymers into the feed hoppers of a 24:1 Killian single screw extruder equipped with a film die and a chilled casting roll. The extrusion conditions used to produce the films were as follows:

| | | Examples 9–10 Extruder | | Example 11 Extruder | | Example 12 Extruder | |
|---|---|---|---|---|---|---|---|
| | | Main | 2nd | Main | 2nd | Main | 2nd |
| Barrel Temperature | | | | | | | |
| Zone 1 | ° C. | 230 | 71 | 200 | 200 | 200 | 215 |
| Zone 2 | ° C. | 230 | 340 | 230 | 230 | 230 | 220 |
| Zone 3 | ° C. | 230 | 340 | 230 | 230 | 230 | 220 |
| Die Temperature | | | | | | | |
| Zone 1 | ° C. | 230 | 390 | 230 | 230 | 230 | 220 |
| Zone 2 | ° C. | 230 | 230 | 230 | 230 | 230 | 220 |

In Examples 9–10, multi-layer films were prepared having three layers where the outer layers were comprised of 50 wt % filled AAPE and the center layer was unfilled polycaprolactone, PCL, (CAPA 6500 from Solvay). The AAPE component was poly(tetramethylene adipate-co-terephthalate), a copolyester of butane diol with adipic acid and terephthalic acid where the adipic to terephthalic acid ratio is 57/43. In preparing the AAPE compositions containing 50 wt % filler of the examples herein, the AAPE component and the filler were compounded in a Kobelco continuous mixer model NEX-T60. The mixer was operated at 176° C., and a mixing speed of 600 rpm. The AAPE component and the filler were fed to the mixer to produce an AAPE filler composition containing 70 wt % filler. This AAPE filler composition was then pellet-pellet blended with unfilled AAPE to reduce the filler content to 50 or 20 wt %. The filler utilized was Filmlink™ 500 calcium carbonate. Each of the compositions of Examples 9–10 were coextruded into multi-layer film as shown herein. The components were dried overnight to remove moisture prior to coextrusion. Each of the films of Examples 9–10 were then biaxially stretched at room temperature, as shown herein, by means of the hand stretching method. The stretched films of Examples 9–10 were then evaluated to determine the properties set forth in Table 3. The MVTR of a monolayer film of the same unfilled AAPE component is shown in Table 1 and the same unfilled PCL component with a film thickness of 169 μm is shown in Table 3.

TABLE 3

Film Properties

| Example No. | 9 | 10 | Unfilled PCL |
|---|---|---|---|
| Average MVTR, g-μm/m²/hour | 2036 | 2033 | 393 |
| Stretched film thickness (μm) | 60.3 | 59 | — |
| Unstretched film layer thickness | | | |
| Top layer (μm) | 68 | 81.5 | — |
| Center layer (μm) | 24 | 30.5 | — |
| Bottom layer (μm) | 54.5 | 68.5 | — |

In Example 11, multi-layer films were prepared having three layers where the outer layers were comprised of 50 wt % filled AAPE and the center layer was unfilled polyester-ether, (Hytrel from DuPont, a copolyester block copolymer of poly(butylene terephthalate) and poly(tetramethylene glycol)). The AAPE component was poly(tetramethylene adipate-co-terephthalate), a copolyester of butane diol with adipic acid and terephthalic acid where the adipic to terephthalic acid ratio is 57/43. In preparing the AAPE compositions containing 50 wt % filler of the examples herein, the AAPE component and the filler were compounded in a Kobelco continuous mixer model NEX-T60. The mixer was operated at 175° C., and a mixing speed of 600 rpm. The AAPE component and the filler were fed to the mixer to produce an AAPE filler composition containing 50 wt % filler. The filler utilized was Omtacarb™ 2 SS T-FL calcium carbonate. The compositions of Example 11 was coextruded into multi-layer film as shown herein. The components were dried overnight to remove moisture prior to coextrusion. The films of Examples 11 was then biaxially stretched at room temperature, as shown herein, by means of the hand stretching method. The stretched film of Example 11 was then evaluated to determine the properties set forth in Table 4. The MVTR of a monolayer film of the same unfilled AAPE component is shown in Table 1 and the same unfilled polyester-ether component with a film thickness of 75.5 μm is shown in Table 4.

TABLE 4

Film Properties

| Example No. | 11 | Unfilled Polyester-ether |
|---|---|---|
| Average MVTR, g-μm/m²/hour | 1688 | 699 |
| Stretched film thickness (μm) | 56.8 | — |
| Unstretched film layer thickness | | |
| Top layer (μm) | 51 | — |
| Center layer (μm) | 43.3 | — |
| Bottom layer (μm) | 42 | — |

In Example 12, multi-layer films were prepared having three layers where the outer layers were comprised of 50 wt % filled AAPE and the center layer was unfilled polyurethane, (ESTANE 58149 from BF Goodrich). The AAPE component was poly(tetramethylene adipate-co-terephthalate), a copolyester of butane diol with adipic acid and terephthalic acid where the adipic to terephthalic acid ratio is 57/43. In preparing the AAPE compositions containing 50 wt % filler of the examples herein, the AAPE component and the filler were compounded in a Kobelco continuous mixer model NEX-T60. The mixer was operated at 175° C., and a mixing speed of 600 rpm. The AAPE component and the filler were fed to the mixer to produce an AAPE filler composition containing 50 wt % filler. The filler utilized was Omtacarb™ 2 SS T-FL calcium carbonate. The composition of Example 12 was coextruded into multi-layer film as shown herein. The components were dried overnight to remove moisture prior to coextrusion. The film of Examples 12 was then biaxially stretched at room temperature, as shown herein, by means of the hand stretching method. The stretched film of Example 12 was then evaluated to determine the properties set forth in Table 5. The MVTR of a monolayer film of the same unfilled AAPE component is shown in Table 1 and the same unfilled polyester-ether component with a film thickness of 96.3 mil is shown in Table 5.

TABLE 5

Film Properties

| Example No. | 12 | Unfilled Polyurethane |
|---|---|---|
| Average MVTR, g-mil/m²/day | 1919 | 488 |
| Stretched film thickness (μm) | 52 | — |
| Unstretched film layer thickness | | |
| Top layer (μm) | 55 | — |
| Center layer (μm) | 8.5 | — |
| Bottom layer (μm) | 26 | — |

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A multilayer film comprising:
   (a) a first layer comprising from about 70 to 100 weight percent of at least one or more thermoplastic polymer (s) having a MVTR value of at least 300 g-μm/m²-hour or g-mil/m²-day, as determined in accordance with ASTM Test Method E-96D, and from 0 to about 30 weight percent filler, and
   (b) a second layer comprising from about 20 to about 80 weight percent of at least one or more thermoplastic polymer(s) and from about 20 to about 80 weight percent filler, the second layer having in stretched form a MVTR value, according to ASTM E-96D, greater than the MVTR value, according to ASTM E-96D, of the at least one or more thermoplastic polymer(s) of the second layer;
   wherein the second layer comprises an amount of filler differing from the amount of filler in the first layer when the at least one or more thermoplastic polymer(s) of the first layer and the at least one or more thermoplastic polymer(s) of the second layer are the same,
   wherein the first layer is adjacent to the second layer, and
   wherein the multilayer film, in stretched form, has a MVTR value, according to ASTM E-96D, greater than the MVTR value, according to ASTM E-96D, of the at least one or more thermoplastic polymer(s) of the first layer.

2. The multilayer film according to claim 1 wherein the at least one or more thermoplastic polymer(s) of the first layer and the at least one or more thermoplastic polymer(s) of the second layer are the same.

3. The multilayer film according to claim 1 wherein the at least one or more thermoplastic polymer(s) of the first layer has a MVTR value ranging from at least 300 to about 10,000 g-$\mu$m/m$^2$-hour or g-mil/m$^2$-day.

4. The multilayer film according to claim 1 wherein the thermoplastic polymer of the first layer is selected from the group consisting of polylactic acid polymers and copolymers, polyurethanes, polyhydroxybutyrate copolymers with co-monomers of valeric acid and gamma hydroxy alkanoates, polyesteramides, poly vinyl alcohol, cellulose esters, polycaproyl lactone polymers and copolymers, copolymers of terephthalic acid, and isophthalic acid, with diols and polytetramethylene glycol or polypropylene glycol, polyether amides with polyethylene glycol, polyethylene glycol modified polybutylene terephthalate, polyether urethanes, and a linear or branched or chain extended, random, aliphatic-aromatic copolyester comprised of repeat units of:

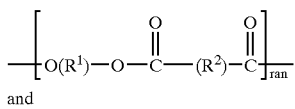
and
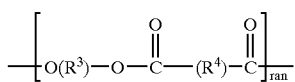

wherein
$R^1$ is selected from one or more of the groups consisting of $C_2$–$C_8$ alkylene or oxylalkylene and the mole percent of $R^1$ is from about 80 to 100;
$R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;
$R^2$ is selected from one or more of the groups consisting of $C_2$–$C_{12}$ alkylene or oxyalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;
$R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65;
or blends thereof.

5. The multilayer film according to claim 1, wherein the thermoplastic polymer of the first layer is a linear or branched or chain extended, random, aliphatic-aromatic copolyester comprised of repeat units of:

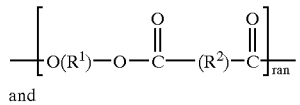
and
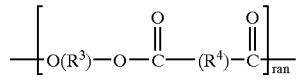

wherein
$R^1$ is selected from one or more of the groups consisting of $C_2$–$C_8$ alkylene or oxylalkylene and the mole percent of $R^1$ is from about 80 to 100;
$R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;
$R^2$ is selected from one or more of the groups consisting of $C_2$–$C_{12}$ alkylene or oxyalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;
$R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65.

6. The multilayer film according to claim 5 wherein $R^1$ is selected from $C_2$–$C_8$ alklyene and is present in an amount of from about 90 to 100 mole percent, $R^3$ is present in an amount of from 0 to about 10 mole percent; $R^2$ is selected from one or more of the groups consisting of $C_2$–$C_8$ alkylene or oxyalkylene and is present in an amount of from about 35 to about 95 mol percent; and $R^4$ is selected from one or more of the groups consisting of $C_6$–$C_{10}$ aryl and is present in an amount of from about 5 to about 65 mole percent.

7. The multilayer film according to claim 5 wherein $R^1$ is selected from $C_2$–$C_4$ alklyene and is present in an amount of from about 95 to 100 mole percent; $R^3$ is present in an amount of from 0 to about 5 mole percent; $R^2$ is selected from one or more of the groups consisting of $C_2$–$C_6$ alkylene or $C_2$ oxyalkylene and is present in an amount of from about 35 to about 65 mole percent; and $R^4$ is a 1,4-disubstituted-$C_6$ aryl and is present in an amount of from about 35 to about 65 mole percent.

8. The multilayer film according to claim 1, in stretched form.

9. An article of manufacture comprising the multilayer film according to claim 8.

10. An article of manufacture comprising the multilayer film according to claim 1.

11. The multilayer film according to claim 1 wherein the filler is calcium carbonate.

12. A multilayer film comprising:
(a) a first layer comprising from about 70 to 100 weight percent of at least one or more thermoplastic polymer(s) having a MVTR value of at least 300 g-$\mu$m/m$^2$-hour or g-mil/m$^2$-day, as determined in accordance with ASTM Test Method E-96D. and from 0 to about 30 weight percent filler, wherein the at least one or more thermoplastic polymer(s) is a linear or branched or chain extended, random, aliphatic-aromatic copolyester(s) which is based on 100 mole percent of an acid component and 100 mole percent of a diol component and is selected from the group consisting of copolyesters comprising:
  (a) an acid component of from about 30 to about 75 mole percent glutaric acid and from about 25 to about 70 mole percent terephthalic acid and a diol component of from about 90 to 100 mole percent 1,4-butanediol and from 0 to about 10 mole percent of a modifying diol;
  (b) an acid component of from about 30 to about 95 mole percent succinic acid and from about 5 to about 70 mole percent terephthalic acid and a diol component of from about 90 to 100 mole percent 1,4-butanediol and from 0 to about 10 mole percent of a modifying diol; and
  (c) an acid component of from about 30 to about 75 mole percent adipic acid and from about 25 to about 70 mole percent terephthalic acid and a diol component of from about 90 to 100 mole percent 1,4-butanediol and from 0 to about 10 mole percent of a modifying diol; and
(b) a second layer comprising from about 20 to about 80 weight percent of at least one or more thermoplastic polymer(s) and from about 20 to about 80 weight percent filler, the second layer having in stretched form a MVTR value, according to ASTM E-96D, greater than the MVTR value, according to ASTM E-96D, of the at least one or more thermoplastic polymer(s) of the second layer;
wherein the second layer comprises an amount of filler differing from the amount of filler in the first layer when the at least one or more thermoplastic polymer(s) of the first layer and the at least one or more thermoplastic polymer(s) of the second layer are the same,
wherein the first layer is adjacent to the second layer, and wherein the multilayer film, in stretched form, has a MVTR value, according to ASTM E-96D, greater than the MVTR value, according to ASTM E-96D, of the at least one or more thermoplastic polymer(s) of the first layer.

13. The multilayer film according to claim 12 wherein the modifying diol is selected from the group consisting of 1,4-cyclohexanedimethanol, triethylene glycol, polyethylene glycol and neopentyl glycol.

14. The multilayer film according to claim 12 wherein the acid component comprises about 50 to about 60 mole percent adipic acid and about 40 to about 50 mole percent terephthalic acid and the glycol component comprises at least about 95 to 100 mole percent 1,4-butanediol.

15. The multilayer film according to claim 14 wherein the acid component comprises from about 55 to about 60 mole percent adipic acid and about 40 to about 45 mole percent terephthalic acid.

16. A multilayer film comprising:
(a) a first layer comprising
  (i) from about 70 to 100 weight percent of at least one or more linear or branched or chain extended, random, aliphatic-aromatic copolyester(s) having a MVTR value of at least 300 g-$\mu$m/m$^2$-hour or g-mil/m$^2$-day, as determined in accordance with ASTM Test Method E-96D, and comprising repeat units of:

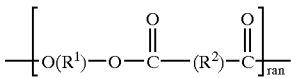

and

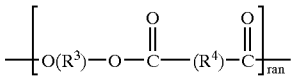

wherein
R$^1$ is selected from one or more of the groups consisting of C$_2$–C$_8$ alkylene or oxylalkylene and the mole percent of R$^1$ is from about 80 to 100;
R$^3$ is selected from one or more of the groups consisting of C$_2$–C$_8$ alkylene or oxylalkylene; C$_2$–C$_8$ alkylene or oxylalkylene substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^3$ is from 0 to about 20;
R$^2$ is selected from one or more of the groups consisting of C$_2$–C$_{12}$ alkylene or oxyalkylene; C$_2$–C$_{12}$ alkylene or oxyalkylene substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^2$ is from about 35 to about 95;
R$^4$ is selected from one or more of the groups consisting of C$_6$–C$_{10}$ aryl; C$_6$–C$_{10}$ aryl substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^4$ is from about 5 to about 65; and
  (ii) from 0 to about 30 weight percent filler, and
(b) a second layer having in stretched form a MVTR value, according to ASTM E-96D, of at least about 500 g-$\mu$m/m$^2$-hour or g-mil/m$^2$-day and comprising
  (i) from about 20 to about 65 weight percent of at least one or more thermoplastic polymer(s) selected from the group consisting of a polyolefin and a linear or branched or chain extended, random, aliphatic-aromatic copolyester of the first layer and
  (ii) from about 35 to about 80 weight percent filler;
wherein the first layer is adjacent to the second layer and wherein the multilayer film, in stretched form, has a MVTR value, according to ASTM E-96D, greater than the MVTR value, according to ASTM E-96D, of the at least one or more linear or branched or chain extended, random, aliphatic-aromatic copolyester(s) of the first layer.

17. The multilayer film according to claim 16 wherein the at least one or more linear or branched or chain extended, random, copolyester(s) of the first layer has a MVTR value ranging from at least 300 to about 3000 g-$\mu$m/m$^2$-hour or g-mil/m$^2$-day.

18. The multilayer film according to claim 16 wherein the thermoplastic polymer of the second layer is a linear or branched or chain extended, random,

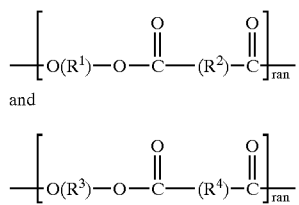
and aliphatic-aromatic copolyester comprised of repeating units of:
wherein
R$^1$ is selected from one or more of the groups consisting of C$_2$–C$_8$ alkylene or oxylalkylene and the mole percent of R$^1$ is from about 80 to 100;
R$^3$ is selected from one or more of the groups consisting of C$_2$–C$_8$ alkylene or oxylalkylene; C$_2$–C$_8$ alkylene or oxylalkylene substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^3$ is from 0 to about 20;
R$^2$ is selected from one or more of the groups consisting of C$_2$–C$_{12}$ alkylene or oxyalkylene; C$_2$–C$_{12}$ alkylene or oxylalkylene substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^2$ is from about 35 to about 95; and
R$^4$ is selected from one or more of the groups consisting of C$_6$–C$_{10}$ aryl; C$_6$–C$_{10}$ aryl substituted with one to four substituents independently selected from the group consisting of halo, C$_6$–C$_{10}$ aryl, and C$_1$–C$_4$ alkoxy; C$_5$–C$_{10}$ cycloalkylene; C$_5$–C$_{10}$ cycloalkylene substituted with one to four substituents independently selected from the group consisting of halo, C$_6$–C$_{10}$ aryl, and C$_1$–C$_4$ alkoxy; and the mole percent of R$^4$ is from about 5 to about 65.

19. The multilayer film according to claim 18, in stretched form.

20. An article of manufacture comprising the multilayer film according to claim 4.

21. An article of manufacture comprising the multilayer film according to claim 18.

22. The multilayer film according to claim 16 wherein the second layer in stretched form has a MVTR value ranging from at least about 500 to about 10,000 g-$\mu$m/m$^2$-hour or g-mil/m$^2$-day.

23. The multilayer film according to claim 16 wherein the filler is calcium carbonate.

24. The multilayer film according to claim 16 wherein R$^1$ is selected from C$_2$–C$_8$ alklyene and is present in an amount of from about 90 to 100 mole percent, R$^3$ is present in an amount of from 0 to about 10 mole percent; R$^2$ is selected from one or more of the groups consisting of C$_2$–C$_8$ alkylene or oxyalkylene and is present in an amount of from about 35 to about 95 mol percent; and R$^4$ is selected from one or more of the groups consisting of C$_6$–C$_{10}$ aryl and is present in an amount of from about 5 to about 65 mole percent.

25. The multilayer film according to claim 16 wherein R$^1$ is selected from C$_2$–C$_4$ alklyene and is present in an amount of from about 95 to 100 mole percent; R$^3$ is present in an amount of from 0 to about 5 mole percent; R$^2$ is selected from one or more of the groups consisting of C$_2$–C$_6$ alkylene or C$_2$ oxyalkylene and is present in an amount of from about 65 to about 35 mole percent; and R$^4$ is a 1,4-disubstituted-C$_6$ aryl and is present in an amount of from about 35 to about 65 mole percent.

26. The multilayer film according to claim 16 wherein the at least one or more linear or branched or chain extended, random, aliphatic-aromatic copolyester(s) is based on 100 mole percent of an acid component and 100 mole percent of a diol component and is selected from the group consisting of copolyesters comprising:
(a) an acid component of from about 30 to about 75 mole percent glutaric acid and from about 25 to about 70 mole percent terephthalic acid and a diol component of from about 90 to 100 mole percent 1,4-butanediol and from 0 to about 10 mole percent of a modifying diol;
(b) an acid component of from about 30 to about 95 mole percent succinic acid and from about 5 to about 70 mole percent terephthalic acid and a diol component of from about 90 to 100 mole percent 1,4-butanediol and from 0 to about 10 mole percent of a modifying diol; and
(c) an acid component of from about 30 to about 75 mole percent adipic acid and from about 25 to about 70 mole percent terephthalic acid and a diol component of from about 90 to 100 mole percent 1,4-butanediol and from 0 to about 10 mole percent of a modifying diol.

27. The multilayer film according to claim 26 wherein the modifying diol is selected from the group consisting of 1,4-cyclohexanedimethanol, triethylene glycol, polyethylene glycol and neopentyl glycol.

28. The multilayer film according to claim 26 wherein the acid component comprises from about 50 to about 60 mole percent adipic acid and about 40 to about 50 mole percent terephthalic acid and the glycol component comprises at least about 95 to 100 mole percent 1,4-butanediol.

29. The multilayer film according to claim 28 wherein the acid component comprises from about 55 to about 60 mole percent adipic acid and about 40 to about 45 mole percent terephthalic acid.

30. The multilayer film according to claim 16, in stretched form.

31. The multilayer film according to claim 30 wherein the multilayer film has a MVTR value greater than about 500 to about 10,000 g-$\mu$m/m$^2$-hour or g-mil/m$^2$-day.

32. An article of manufacture comprising the multilayer film according to claim 16.

* * * * *